United States Patent
Gemignani, Jr.

(10) Patent No.: US 10,284,488 B1
(45) Date of Patent: May 7, 2019

(54) AGGREGATE SOCKET RESOURCE MANAGEMENT

(71) Applicant: EMC Corporation, Hopkinton, MA (US)

(72) Inventor: John Gemignani, Jr., Bremerton, WA (US)

(73) Assignee: EMC CORPORATION, Hopkinton, MA (US)

(*) Notice: Subject to any disclaimer, the term of this patent is extended or adjusted under 35 U.S.C. 154(b) by 195 days.

(21) Appl. No.: 15/085,442

(22) Filed: Mar. 30, 2016

(51) Int. Cl.
H04L 12/835 (2013.01)
H04L 12/911 (2013.01)
H04L 12/801 (2013.01)

(52) U.S. Cl.
CPC .............. H04L 47/78 (2013.01); H04L 47/10 (2013.01); H04L 47/30 (2013.01); H04L 47/29 (2013.01)

(58) Field of Classification Search
CPC .......... H04L 47/10; H04L 47/29; H04L 47/30
See application file for complete search history.

(56) References Cited

U.S. PATENT DOCUMENTS

| | | | | |
|---|---|---|---|---|
| 6,272,589 | B1* | 8/2001 | Aoki | G06F 3/0607 710/56 |
| 6,289,386 | B1* | 9/2001 | Vangemert | H04L 47/10 709/232 |
| 6,788,697 | B1* | 9/2004 | Aweya | H04L 49/90 370/235 |
| 2002/0080721 | A1* | 6/2002 | Tobagi | H04L 29/06 370/236 |
| 2004/0103245 | A1* | 5/2004 | Fukusawa | G11B 20/10527 711/113 |
| 2005/0055406 | A1* | 3/2005 | Singhai | H04L 47/10 709/206 |
| 2007/0076735 | A1* | 4/2007 | Soo | G06F 13/385 370/412 |
| 2014/0059247 | A1* | 2/2014 | Vachharajani | H04L 47/24 709/234 |
| 2015/0055660 | A1* | 2/2015 | Takase | H04W 28/14 370/412 |

* cited by examiner

*Primary Examiner* — Jeong S Park
(74) *Attorney, Agent, or Firm* — Amin, Turocy & Watson, LLP

(57) ABSTRACT

Aggregate socket resource management is presented herein. A system can comprise a processor; and a memory that stores executable instructions that, when executed by the processor, facilitate performance of operations, comprising: determining a present aggregate amount of data associated with processing requests from a socket; setting a defined aggregate data limit on the present aggregate amount of data; and in response to determining changes in a difference between the defined aggregate data limit and the present aggregate amount of data, modifying a defined data capacity limit on a data capacity of a receive buffer of the socket. In an example, the determining of the changes in the difference between the defined aggregate data limit and the present aggregate amount of data comprises reducing/increasing the defined data capacity limit in response to the difference being determined to be decreasing/increasing.

20 Claims, 11 Drawing Sheets

AGGREGATE SOCKET RESOURCE MANAGEMENT

TECHNICAL FIELD

The subject disclosure generally relates to embodiments for aggregate socket resource management.

BACKGROUND

A network socket layer is usually designed for a time-sharing, i.e., multi-tasking, workflow. For example, a server application can send/receive data with multiple client(s), applications(s), etc. utilizing respective network sockets. Conventionally, management of resources associated with network sockets is limited, i.e., although user-mode server applications can control transmit/receive limitations, or reserves, of a socket, such control is time-consuming and computationally expensive. Consequently, conventional network technologies have had some drawbacks with respect to management of socket resources, some of which may be noted with reference to the various embodiments described herein below.

BRIEF DESCRIPTION OF THE DRAWINGS

Non-limiting embodiments of the subject disclosure are described with reference to the following figures, wherein like reference numerals refer to like parts throughout the various views unless otherwise specified.

DETAILED DESCRIPTION

Figure 1:
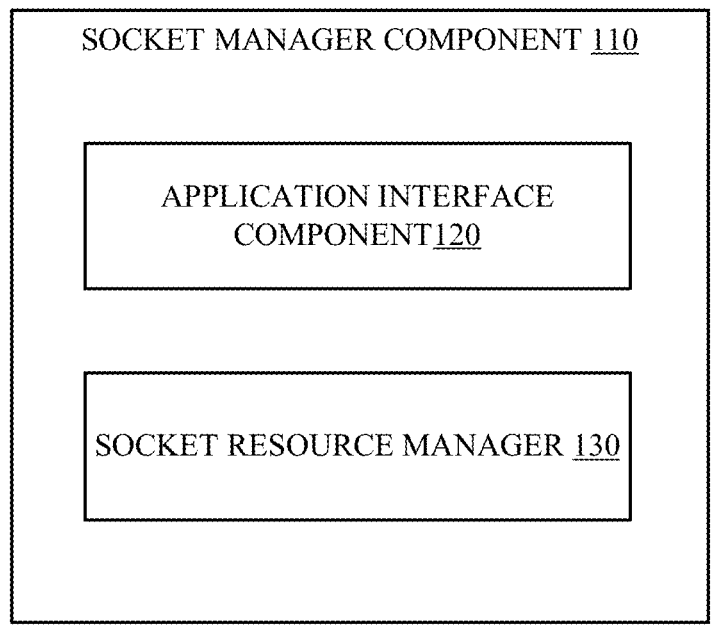
FIG. 1 illustrates a block diagram of a socket manager component, in accordance with various embodiments.

Aspects of the subject disclosure will now be described more fully hereinafter with reference to the accompanying drawings in which example embodiments are shown. In the following description, for purposes of explanation, numerous specific details are set forth in order to provide a thorough understanding of the various embodiments. However, the subject disclosure may be embodied in many different forms and should not be construed as limited to the example embodiments set forth herein.

As described above, conventional server technologies have had some drawbacks with respect to managing socket resources. On the other hand, various embodiments disclosed herein can improve file server performance by apportioning resources among sockets, groups comprising sockets, and/or groups comprising groups of sockets for effective use of such resources.

For example, a system, e.g., a file server, network file system (NFS) server, etc. can comprise a processor, and a memory that stores executable instructions that, when executed by the processor, facilitate performance of operations, comprising: determining a present aggregate amount of data associated with processing requests from a socket; setting a defined aggregate data limit on the present aggregate amount of data associated with the processing of the requests from the socket; and in response to determining changes in a difference between the defined aggregate data limit and the present aggregate amount of data associated with the processing of the requests from the socket, modifying a defined data capacity limit on a data capacity of a receive buffer of the socket.

In embodiment(s), the determining the present aggregate amount of data associated with the processing of the requests can comprise: (A) determining an amount of received request data in the receive buffer that is pending being read from the receive buffer; (B) determining an amount of read request data that has been read from the receive buffer and is being processed and/or pending being processed; (C) determining a predicted amount of reply data that is predicted to be generated as a result of the read request data; and/or (D) determining an amount of reply data that has been written to a send buffer of the socket and is pending transmission.

In one embodiment, the determining the changes comprises reducing the defined data capacity limit on the data capacity of the receive buffer in response to the difference between the defined aggregate data limit and the present aggregate amount of data being determined to be decreasing.

In another embodiment, the determining the changes comprises increasing the defined data capacity limit on the data capacity of the receive buffer in response to the difference between the defined aggregate data limit and the present aggregate amount of data being determined to be increasing.

In yet another embodiment, the determining the changes comprises setting the defined data capacity limit on the data capacity of the receive buffer to zero in response to the present aggregate amount of data being determined to be greater than or equal to the defined aggregate data limit.

In an embodiment, the operations can further comprise relating, based on a first defined criterion, e.g., with respect to data throughput requirements of sockets of respective clients of the system, the socket to a first group comprising sockets. Further, the operations can comprise determining a first sum of present aggregate amounts of data associated with processing requests from the first group; setting a first defined group aggregate data limit on the first sum of present aggregate amounts of data associated with the processing of the requests from the first group; and apportioning resources among the sockets in response to detecting a first change of a first difference between the first defined group aggregate data limit and the first sum of present aggregate amounts of data associated with the processing of the requests from the first group.

In one embodiment, the apportioning of the resources among the sockets of the first group comprises modifying the first defined aggregate data limit on the present aggregate amount of data associated with the processing of the requests from the socket. In other embodiment(s), such apportioning of the resources among the sockets can initiate a redetermination of the present aggregate amount of data associated with the processing of the requests from the socket, and/or initiate an adjustment of the defined data capacity limit on the data capacity of the receive buffer of the socket.

In another embodiment, the operations can comprise relating, based on a second defined criterion, the first group comprising the sockets to a second group comprising groups of socket groups. Further, the operations can comprise determining a second sum of present aggregate amounts of data associated with processing requests from the second group; setting a second defined groups aggregate data limit on the second sum of present aggregate amounts of data associated with the processing of the requests from the second group; and apportioning the resources among the groups of socket groups in response to detecting a second change of a second difference between the second defined groups aggregate data limit and the second sum of present aggregate amounts of data associated with the processing of the requests from the second group.

In yet another embodiment, the apportioning the resources among the groups of socket groups comprises modifying the first defined group aggregate data limit on the first sum of present aggregate amounts of data associated with the processing of the requests from the first group.

In one embodiment, a method can comprise: determining, by a system comprising a processor, a current aggregate amount of memory permitted and/or allowed for processing requests from a socket;

setting, by the system, a defined aggregate limit on the current aggregate amount of memory permitted and/or allowed for the processing of the requests; and in response to determining changes in a difference between the defined aggregate limit and the current aggregate amount of memory permitted and/or allowed for the processing of the requests, adjusting, by the system, a defined maximum data capacity of a receive buffer of the socket.

In other embodiment(s), the determining the current aggregate amount of memory permitted and/or allowed for the processing of the requests from the socket comprises: determining an amount of received request data in the receive buffer that is pending being read from the receive buffer; determining an amount of read request data that has been read from the receive buffer and is at least one of being processed or pending being processed; determining a predicted amount of data that is predicted to be generated as a result of the read request data; and/or determining an amount of response data that has been written to a send buffer of the socket and is pending being sent to a client.

One embodiment can comprise a computer-readable storage medium comprising instructions that, in response to execution, cause a device comprising a processor to perform operations, comprising: in response to receiving requests in a receive buffer of a socket, determining an aggregate amount of memory to be consumed, by the device, for processing the requests; providing an aggregate limit on the aggregate amount of memory to be consumed; and based on an ongoing evaluation of a difference between the aggregate limit and the aggregate amount of memory to be consumed, dynamically modifying a defined maximum storage capacity of the receive buffer.

In an embodiment, the dynamically modifying the defined maximum storage capacity comprises increasing the defined maximum storage capacity of the receive buffer in response to determining that the difference between the aggregate limit and the aggregate amount of memory being consumed has been increasing.

In another embodiment, the dynamically modifying the defined maximum storage capacity comprises decreasing the defined maximum storage capacity of the receive buffer in response to determining that the difference between the aggregate limit and the aggregate amount of memory being consumed has been decreasing.

As described above, user-mode server application control of transmit/receive limitations of a network socket is time-consuming and computationally expensive. Various embodiments described herein can improve utilization of socket resources by dynamically modifying socket resources within a kernel space.

Figure 2:
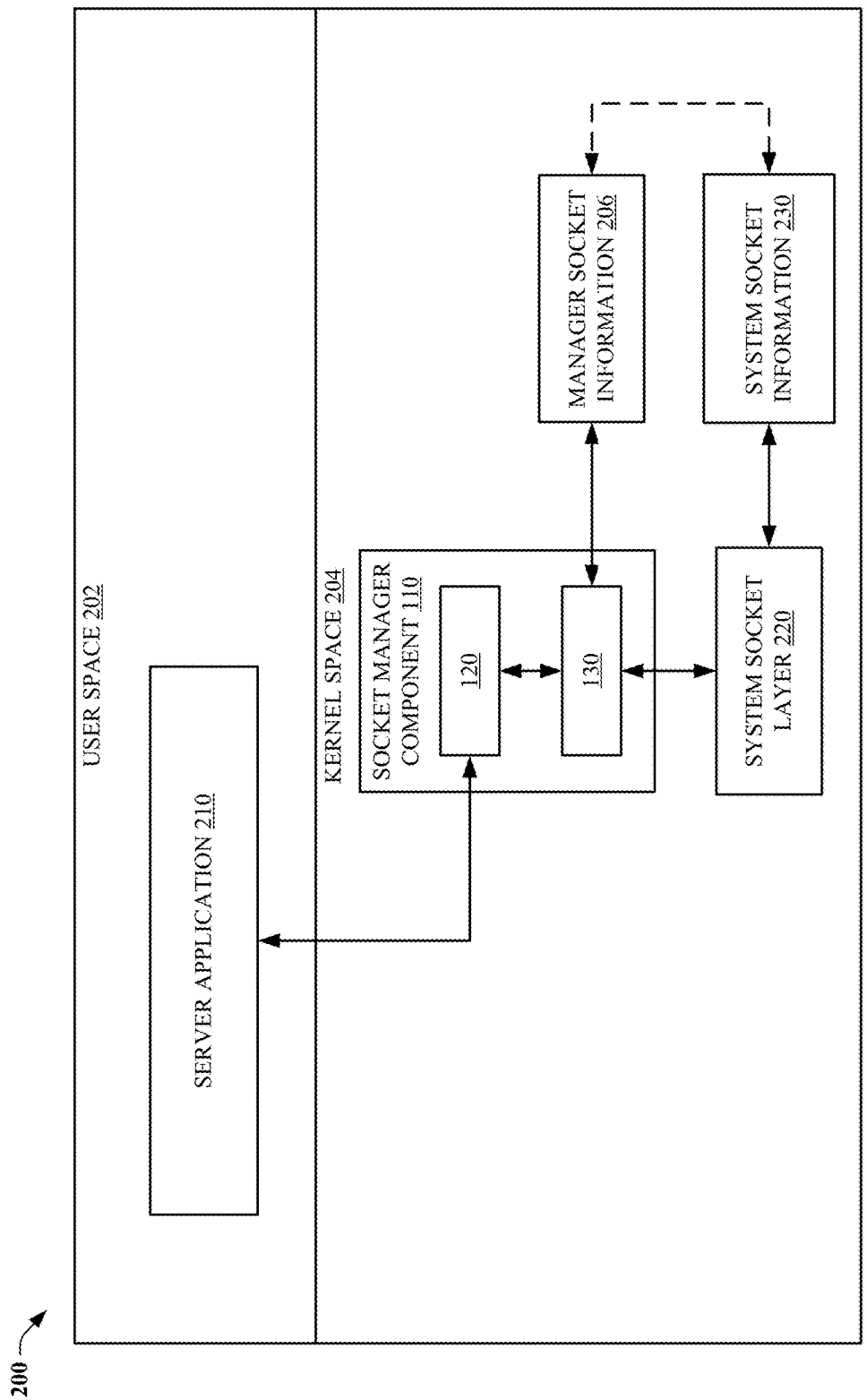
FIG. 2 illustrates a block diagram of a file server environment associated with aggregate socket resource management, in accordance with various embodiments.
Figure 3:
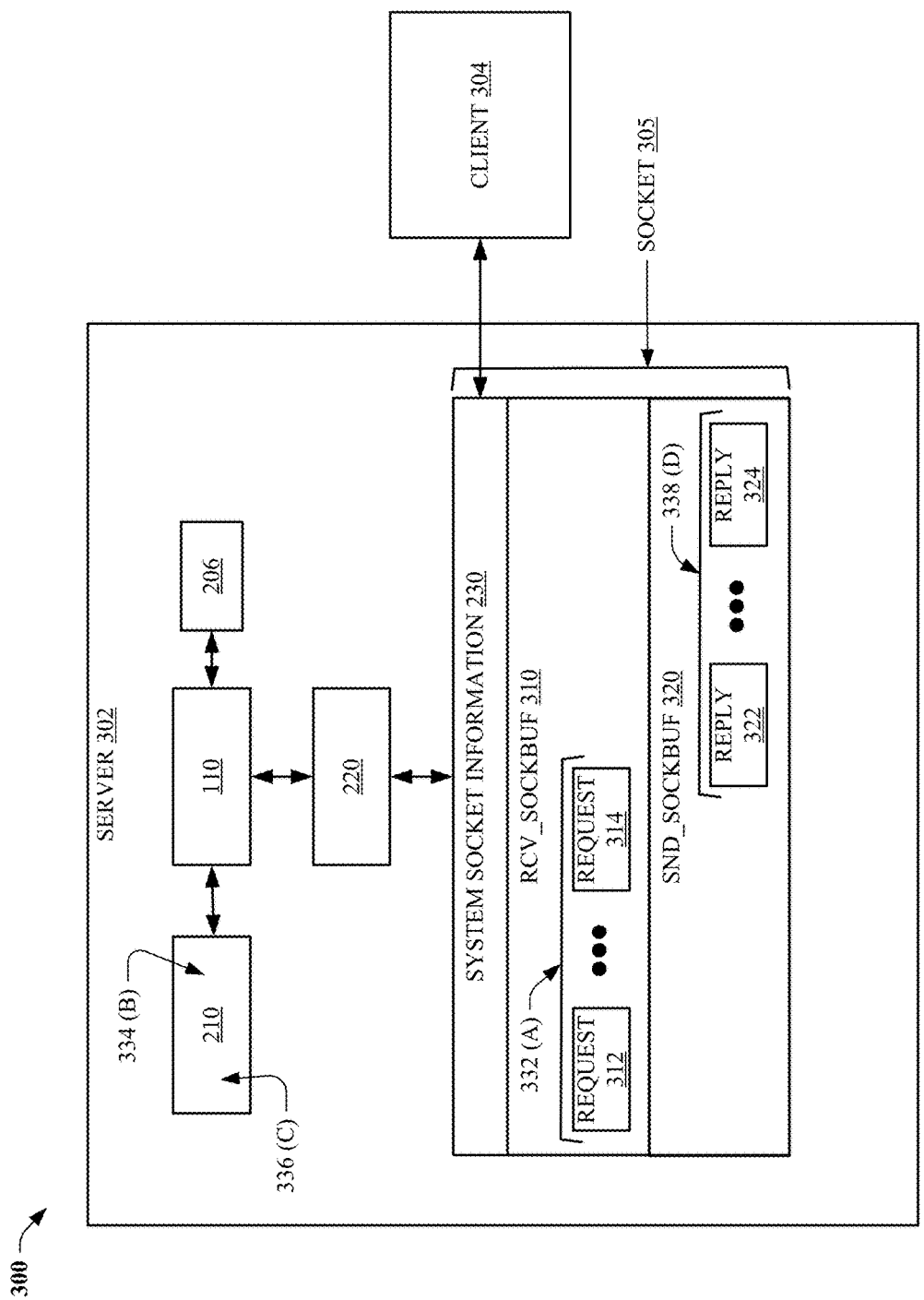
FIG. 3 illustrates a block diagram of a file server comprising a socket manager component, in accordance with various embodiments.
Figure 4:
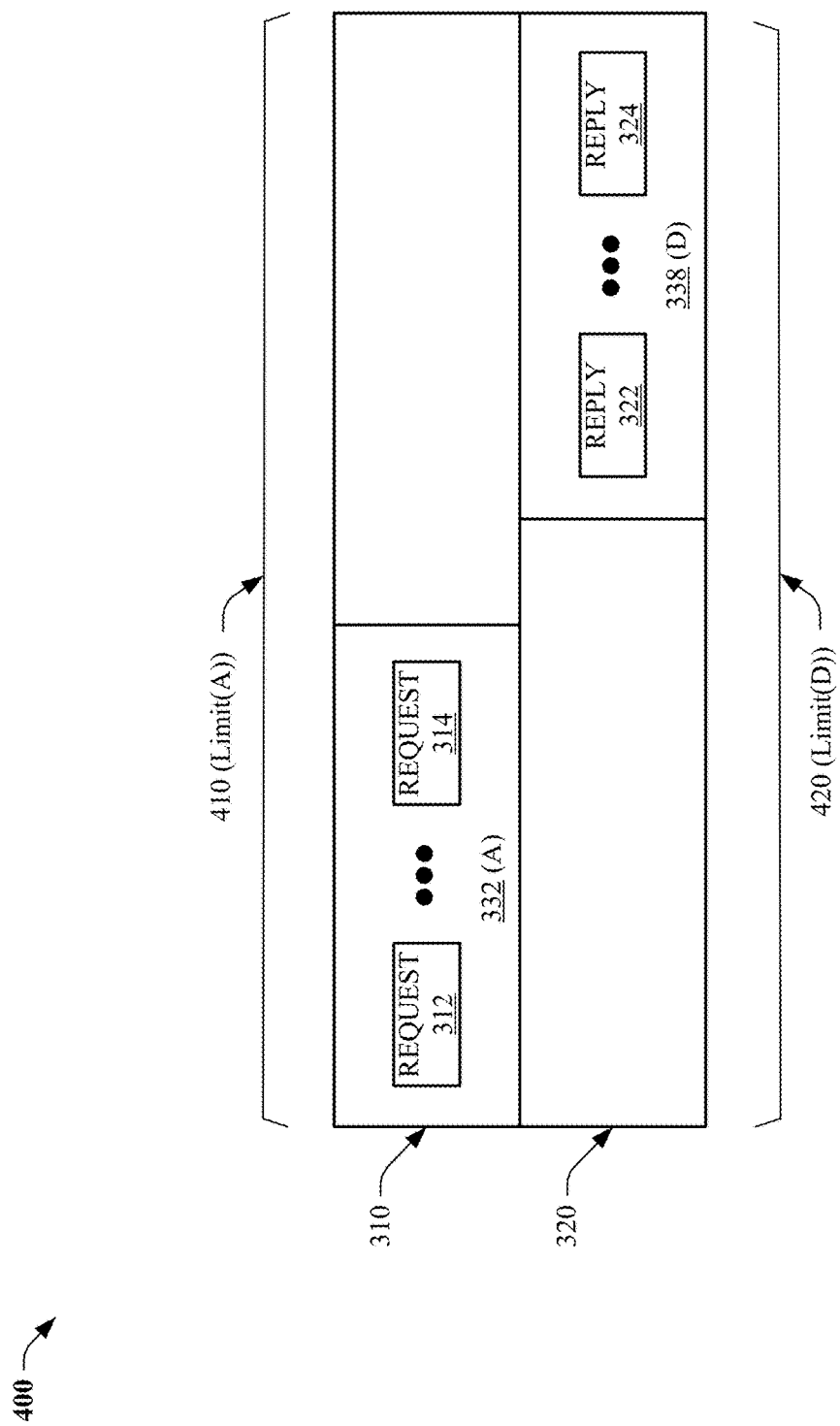
FIG. 4 illustrates a block diagram of a socket, in accordance with various embodiments.

Now referring to FIGS. 1-3, block diagrams (100, 200, 300) of a socket manager component (110), a file server environment (200) comprising the socket manager component, and a file server (302) comprising the socket manager component are illustrated, respectively, in accordance with various embodiments. Server application 210 can be implemented within user space 202 for transmitting/receiving data to/from respective clients, e.g., client 304, via respective sockets associated with system socket layer 220 and system socket information 230—implemented in a kernel address space, e.g., kernel space 204, of an operating system of server 302.

In this regard, server application 210 can create a network socket, e.g., socket 305, and access a limited amount of information associated with the network socket using various system calls directed, via socket manager component 110, to system socket layer 220, system socket information 230, and manager socket information 206. In an embodiment, server application 210 can create socket 305 using a socket( ) system call, and system socket layer 220 can provide services for socket 305 such as connection-oriented data stream support, reliability, and data flow control.

It should be appreciated by those skilled in the art of network technologies having the benefit of the instant disclosure that in other embodiments (not shown), server application 210 can be implemented as a kernel application built into kernel space 204, and can interact, e.g., via socket manager component 110, with socket 305 using an address of socket 305 and system socket support routines.

Socket 305 can be implemented in the kernel address space using a socket structure struct socket, which comprises a general abstraction of a connection endpoint and information that server application 210 can use to transmit/receive data to/from client 304. In this regard, socket 305 has two buffer control substructures, e.g., struct sockbuf, used to manage an ordered list of memory buffers, e.g., struct mbuf. One of the buffer control substructures, e.g., receive sockbuf (RCV_SOCKBUF 310), is used to receive request data from client 304. The other buffer control substructure, e.g., send sockbuf (SND_SOCKBUF 320), is used to transmit corresponding reply data to client 304.

In this regard, Table I below represents respective states of server application 210, socket manager 110, and socket 305 with respect to dynamic modification of socket resources of socket 305, in accordance with various embodiments. Changes in values between steps of Table I are emphasized in bold characters.

TABLE I

| STEP | SERVER APPLICATION 210 | SOCKET MANAGER COMPONENT 110 | SOCKET 305 | DETAILS (bytes) |
|---|---|---|---|---|
| 1 | Server creates listener (network EP listens for connection requests - port(s)) with limits set for A (Limit(A)) & D (Limit(D)) = 10,000 bytes. | | Limit(A) and Limit(D) set for the listener. | A = 0<br>B = 0<br>C = 0<br>D = 0<br>X = A + B + C + D (= 0)<br>Limit(A) = 10,000<br>Limit(D) = 10,000 |
| 2 | Server sets Y = Limit(X) = 10,000 bytes. | Records Y. | | Y = Limit(X) = 10,000 |
| 3 | Client connects to server (new connection). | | | |
| 4 | Server accepts the new connection (new socket). | | Socket created with Limit(A), Limit(D), and Y = Limit(X) from the listener. | A = 0<br>B = 0<br>C = 0<br>D = 0<br>X = 0<br>Y = 10,000<br>Limit(A) = 10,000<br>Limit(D) = 10,000 |
| 5 | Client sends, and server receives, 1,000 bytes of data. | | Data received in the receive sockbuf. A is the count of that data. | A = 1,000<br>B = 0,<br>C = 0<br>D = 0<br>X = 0<br>Y = 10,000<br>Limit(A) = 10,000<br>Limit(D) = 10,000 |
| 6 | | Calculates X, and based on a determination that Y-X has decreased, reduces Limit(A). In turn, the amount of data that can be sent by client or received by server is reduced. | | A = 1,000<br>B = 0<br>C = 0<br>D = 0<br>X = 1,000<br>Y = 10,000<br>Limit(A) = 9,000<br>Limit(D) = 10,000 |
| 7 | Server application (APP) reads the data from the socket using special read option to obtain B. | | Returns the data to server APP, and subtracts the count of data returned to the server APP from A. Updates value of B. | A = 0<br>B = 1,000<br>C = 0<br>D = 0<br>X = 1,000<br>Y = 10,000<br>Limit(A) = 9,000<br>Limit(D) = 10,000 |
| 8 | Server APP decodes request, and determines C = 8,000 bytes. | Updates C, calculates X, and based on a determination that Y-X has decreased, reduces Limit(A). | | A = 0<br>B = 1,000<br>C = 8,000<br>D = 0<br>X = 9,000<br>Y = 10,000<br>Limit(A) = 1,000<br>Limit(D) = 10,000 |
| 9 | Server APP completes request and writes the reply to the socket using a special write option that also updates B. | Updates the values for B and C. Calculates X and adjusts Limit(A) if necessary. | Reply C is written to the send sockbuf for transmission. D is updated by the count of data written to D. The special write subtracts the count from C. | A = 0<br>B = 0<br>C = 0<br>D = 8,000<br>X = 8,000<br>Y = 10,000<br>Limit(A) = 2,000<br>Limit(D) = 10,000 |
| 10 | | | Completes transmission of the data, and D is updated to reflect such transmission. | A = 0<br>B = 0<br>C = 0<br>D = 0<br>X = 0<br>Y = 10,000<br>Limit(A) = 1,000 |

TABLE I-continued

| SERVER STEP | SERVER APPLICATION 210 | SOCKET MANAGER COMPONENT 110 | SOCKET 305 | DETAILS (bytes) |
|---|---|---|---|---|
| 11 | | Calculates X, and based on a determination that Y-X has increased, increases Limit(A). In turn, amount of data that can be sent by client or received by server is increased. | | Limit(D) = 10,000<br>A = 0<br>B = 0<br>C = 0<br>D = 0<br>X = 0<br>Y = 10,000<br>Limit(A) = 10,000<br>Limit(D) = 10,000 |

At step 1, server application 210 can create, via system socket layer 220, a listener, or network endpoint, to "listen" for connection requests from client 304, e.g., to form a connection between server 302 and client 304. Further, server application 210 can set, e.g., using setsockopt( ) system call(s), a limit 410 (Limit(A)) on a data capacity of the receive sockbuf (310), and a limit 420 (Limit(B)) on a data capacity of the send sockbuf (320).

At step 2, server application 210 can set, e.g., using setsockopt( ) system call(s), an initial defined aggregate data limit (Y=Limit(X)) on a present aggregate amount (X) of data associated with processing requests from the receive sockbuf (310). In this regard, the present aggregate amount (X) of data associated with the processing of the requests from the receive sockbuf (310) comprises: an amount 332 (A) of received request data in the receive sockbuf (310) that is pending being read from the receive sockbuf (310), e.g., comprising REQUEST 312 to REQUEST 314; an amount 334 (B) of request data that has been read from the receive sockbuf (310) and is being processed and/or pending being processed; a predicted amount 336 (C) of reply data that is predicted to be generated as a result of the processing of the request data; and an amount 338 (D) of reply data that has been written to the send sockbuf (320) and is pending transmission, e.g., comprising REPLY 322 to REPLY 324.

In embodiment(s), server application 210 can evaluate, re-evaluate, determine, etc. B and C as request data that is being processed by server application 210. In this regard, application interface component 120 can be notified, alerted, etc. by server application 210, e.g., utilizing application programming interface (API) based system calls, of respective changes, updates, modifications, etc. that have been made to B and/or C. In turn, application interface component 120 can update a storage location of manager socket information 206 with the updated values of B and/or C.

At steps 3 and 4, in response to client 304 sending a connection request to server 302, and server application 210 accepting the connection request, system socket layer 220 can create socket 305. In an embodiment, each buffer control substructure of socket 305 can comprise counts, limits, flags, and mbuf listhead elements used to manage a variable-length chain of memory buffers (or mbufs), and a small area, e.g., approximately 200-240 bytes, for internal data. In this regard, system socket layer 220 can update system socket information 230 with corresponding limits from the listener, e.g., Limit(A), Limit(D), and Y=Limit(X), during creation of manager socket information 206 and socket 305.

At step 5, client 304 can send 1,000 bytes of data, request data, etc. to server 302, and the receive sockbuf (310) of socket 305 can receive the request data. In turn, socket resource manager 130 can receive, from system socket information 230 via system socket layer 220, a notification, alert, etc. of the receive activity on socket 305. Based on the notification of the receive activity, socket resource manager 130 can obtain the current value of A from system socket information 230, and update an associated storage location of manager socket information 206 with the updated value of A.

With respect to an amount (D) of reply data that has been written, by server application 210, to the send sockbuf (320) and is pending transmission to client 304, socket resource manager 130 can receive, from socket system information 230 via system socket layer 220, a notification, alert, etc. of the write activity on socket 305. Based on the notification of the write activity, socket resource manager 130 can obtain the current value of D from system socket information 230, and update an associated storage location of manager socket information 206 with the updated value of D.

In this regard, in response to determining, based on respective notification, alerts, etc. that A, B, C, and/or D have changed, socket resource manager 130 can determine X (as the sum of A, B, C, and D), and update an associated storage location of manager socket information 206 with the updated value of X.

In an embodiment, in response to socket resource manager 130 determining that a difference between Y and X has changed, socket resource manager 130 can modify the data capacity of the receive sockbuf (310), or Limit(A). In this regard, at step 6, in response to socket resource manager 130 determining that the difference between Y and X has decreased, e.g., as a result of X increasing due to the increase in A, socket resource manager 130 can decrease Limit(A)—reducing the amount of data that can be received from client 304. In this regard, socket manager component 110 can dynamically "throttle" down reception of data via socket 305 as the amount of received request data in the receive sockbuf (310) increases.

At step 7, server application 210 can read the request data from the receive sockbuf (310). In turn, the amount of data returned to server application 210 is subtracted, via system socket layer 220, from A. Further, in response to detecting the read activity of the receive sockbuf (310), socket resource manager 130 can obtain the current value of A from system socket information 230, and update an associated storage location within manager socket information 206 with the updated value of A.

In addition, server application 210 can determine, modify, update, etc. B based on the amount of request data that has been read from the receive sockbuf (310). In turn, as described above, application interface component 120 can be notified, by server application 210, of the change in the value of B, and application interface component 120 can update an associated storage location within manager socket information 206 with the updated value of B.

At step 8, server application 210 can determine the predicted amount (C) of the reply data that is predicted to be generated as a result of the request data. In turn, as described above, application interface component 120 can be notified, by server application 210, of the change in the value of C, and application interface component 120 can update an associated storage location within manager socket information 206 with the updated value of C.

In this regard, in response to the updating of the value of C, socket resource manager 130 can determine X (as the sum of A, B, C, and D), and update an associated storage location of manager socket information 206 with the updated value of X. Further, in response to socket resource manager 130 determining that a difference between Y and X has changed, socket resource manager 130 can modify Limit(A). In this regard, in response to socket resource manager 130 determining that the difference between Y and X has decreased, e.g., as a result of X increasing due to the increase in C, socket resource manager 130 can decrease Limit(A)—further "throttling down" reception of data via socket 305.

At step 9, server application 210 can complete processing of the request, generate reply data, and write the reply data to the send sockbuf (320). In turn, in response to server application 210 updating values for B and C, and notifying application interface component 120 of the updated B and C values, application interface component can update associated storage locations within manager socket information 206 with the updated B and C values.

Further, in response to the reply data being written to the send sockbuf (320), socket resource manager 130 can receive, from socket system information 230 via system socket layer 220, a notification, alert, etc. of the write activity on socket 305. Based the notification of the write activity, socket resource manager 130 can obtain the current value of D from system socket information 230, and update an associated storage location of manager socket information 206 with the updated value of D.

In turn, in response to the updating of B, C, and D, socket resource manager 130 can determine X, and update an associated storage location of manager socket information 206 with the updated value of X. Further, in response to socket resource manager 130 determining that a difference between Y and X has changed, socket resource manager 130 can modify Limit(A). In this regard, in response to socket resource manager 130 determining that the difference between Y and X has increased, e.g., as a result of X decreasing due to the increase in B, socket resource manager 130 can increase Limit(A)—"throttling up" reception of data via socket 305.

At steps 10 and 11, in response to a completion of the transmission of the request data from the send sockbuf (320) to client 304, socket resource manager 130 can receive, from socket system information 230 via system socket layer 220, a notification, alert, etc. of the transmission activity on socket 305. Based the notification of the transmit activity, socket resource manager 130 can obtain the current value of D from system socket information 230, and update an associated storage location of manager socket information 206 with the updated value of D.

In turn, in response to updating of the value of D, socket resource manager 130 can determine X (as the sum of A, B, C, and D), and update an associated storage location of manager socket information 206 with the updated value of X. Further, in response to socket resource manager 130 determining that a difference between Y and X has changed, socket resource manager 130 can modify Limit(A). In this regard, in response to socket resource manager 130 determining that the difference between Y and X has increased, e.g., as a result of X decreasing due to the increase in D, socket resource manager 130 can increase Limit(A)—"throttling up" reception of data via socket 305.

Figure 5:
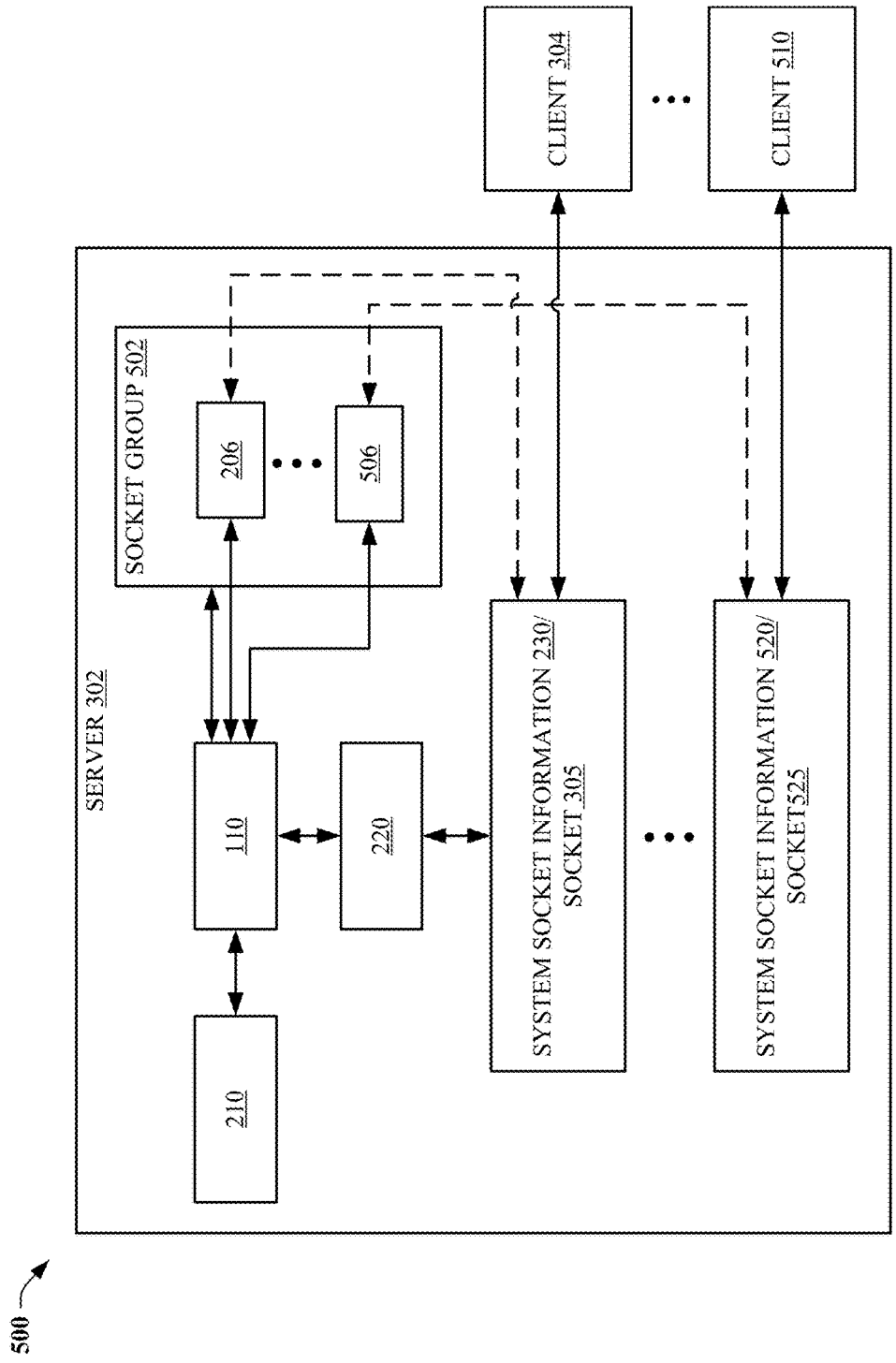
FIG. 5 illustrates a block diagram of a file server comprising a socket group, in accordance with various embodiments.

Now referring to FIG. 5, a block diagram (500) of a file server comprising a socket group is illustrated, in accordance with various embodiments. Socket group 502 can comprise manager socket information 206 and manager socket information 506. In this regard, socket manager component 110 can relate socket 305 to socket group 502 utilizing manager socket information 206 based on a defined criterion. Further, socket manager component 110 can relate socket 525 (corresponding to system socket information 520), which is coupled to client 510, to socket group 502 utilizing manager socket information 506 based on the defined criterion. In embodiment(s), the defined criterion can be determined, set, etc. with respect to, e.g., data capacity, socket type, vendor type, performance (e.g., a data rate corresponding to a socket, network performance), policies (e.g., based on quality of service, performance), etc. Further, socket manager component 110 can determine a sum (XX) of present aggregate amounts of data associated with processing requests from socket group 502. In this regard, XX is a sum of X values for respective sockets (e.g., 305, 525) of socket group 502, which socket manager component 110 can obtain from respective storage locations of manager socket information 206 and manager socket information 506. Further, socket manager component 110 can update a storage location corresponding to socket group 502 with the updated value of XX.

Further, socket manager component 110 can set a defined group aggregate data limit (YY) on XX. In this regard, and now referring to FIG. 6, in response to socket manager component 110 detecting a change of a difference between YY and XX, socket manager component 110 can apportion resources among the sockets. In one embodiment, socket manager component 110 can apportion the resources among the sockets by modifying Y values of respective sockets of socket group 502.

Figure 6:
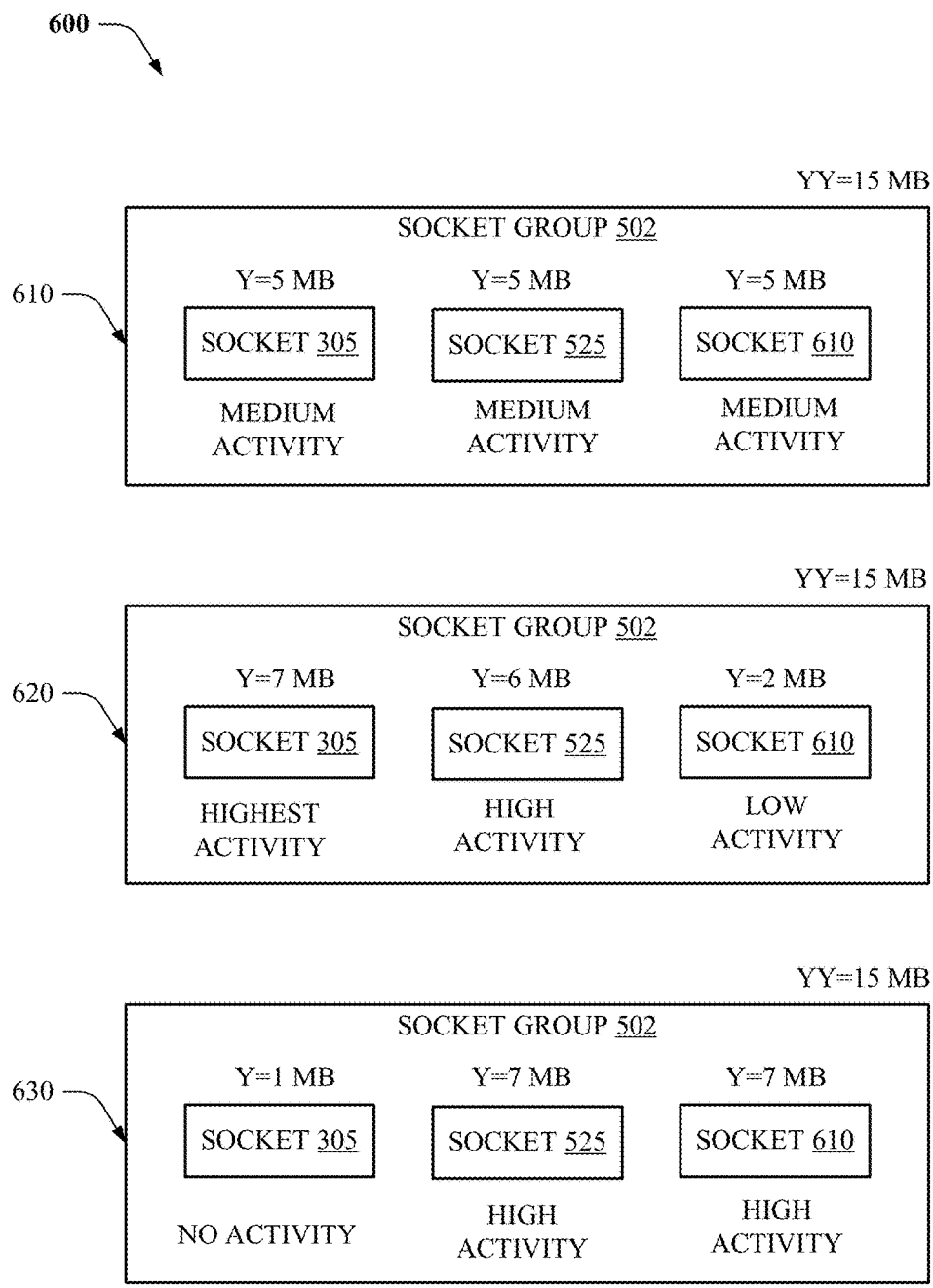
FIG. 6 illustrates apportioning resources among sockets of a group of sockets, in accordance with various embodiments.

In this regard, as illustrated by FIG. 6, YY of socket group 502 is set to 15 MB. At time 610, there is medium activity on the sockets (305, 525, 610) of socket group 502, and accordingly, each of the sockets has been apportioned an equal share of resources, e.g., Y=5 MB. At time 620, socket 305 is determined to be associated with the highest activity, and accordingly apportioned Y=7 MB, while socket 525, associated with high activity, is apportioned Y=6 MB, and socket 610, associated with low activity, is apportioned Y=2 MB. At time 630, socket 305 is determined to be associated with no activity, and accordingly apportioned Y=1 MB, while sockets 525 and 610 are determined to be associated with high activity, and accordingly such sockets are equally apportioned Y=7 MB.

Figure 7:
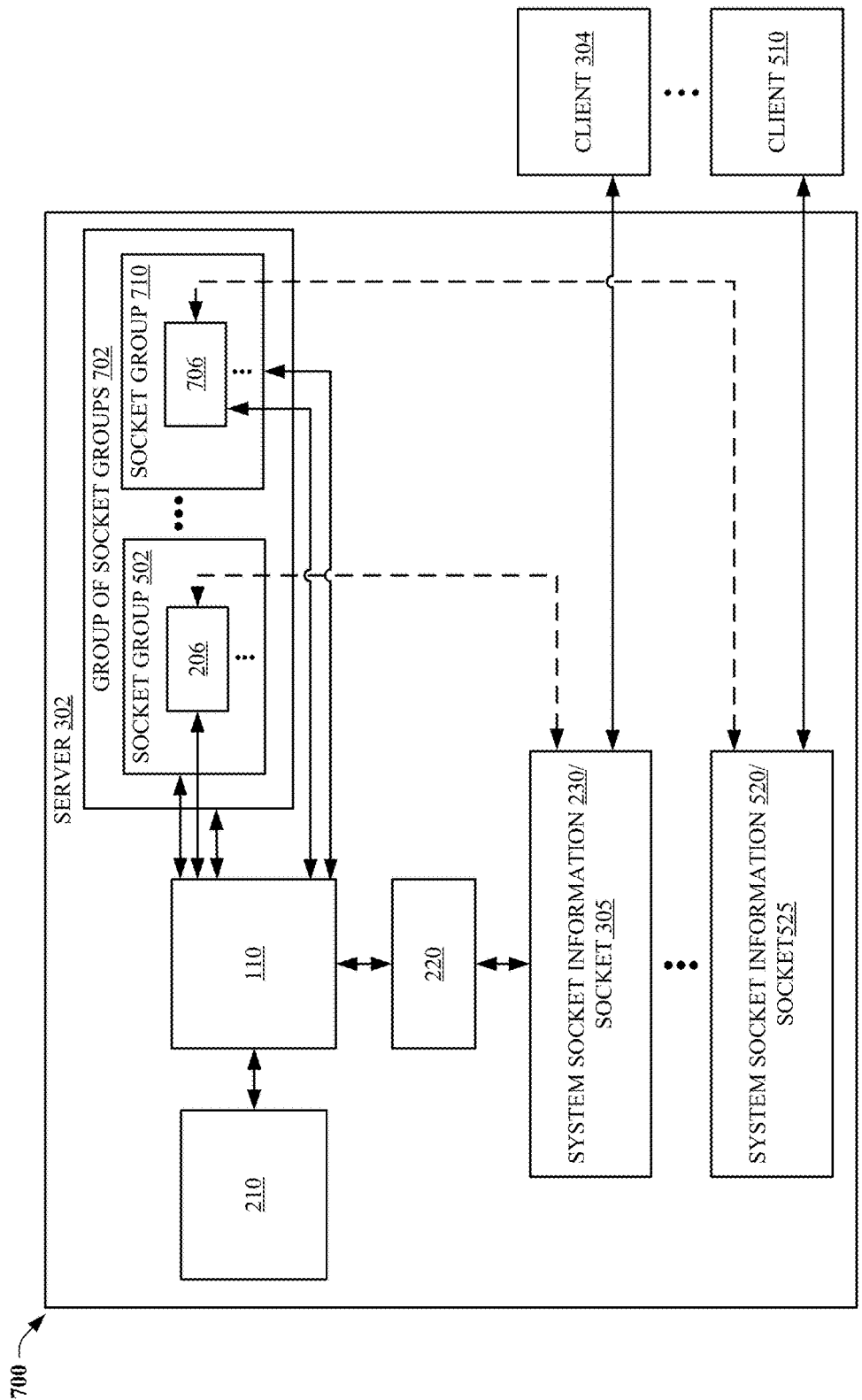
FIG. 7 illustrates a block diagram of a file server comprising socket groups, in accordance with various embodiments.

Referring now to FIG. 7, a block diagram (700) of a file server comprising socket groups is illustrated, in accordance with various embodiments. Group of socket groups 702 can comprise socket group 502 and socket group 710. In this regard, socket manager component 110 can relate the socket groups to group of socket groups 702, e.g., using manager socket information 206 and 706, based on a defined criterion with respect to, e.g., data capacity, socket type, vendor type, performance (e.g., data rate of a socket, network performance), policies based on, e.g., quality of service, performance, etc. Further, socket manager component 110 can determine a sum (XXX) of present aggregate amounts of data associated with processing requests from group of socket groups 702. In this regard, XXX is a sum of XX values for respective socket groups (502, 710) of group of socket groups 702, which socket manager component 110 can obtain from respective storage locations corresponding to group of socket groups 702. Further, socket manager component 110 can update an associated storage location of corresponding to group of socket groups 702 with the updated value of XXX.

Figure 8:
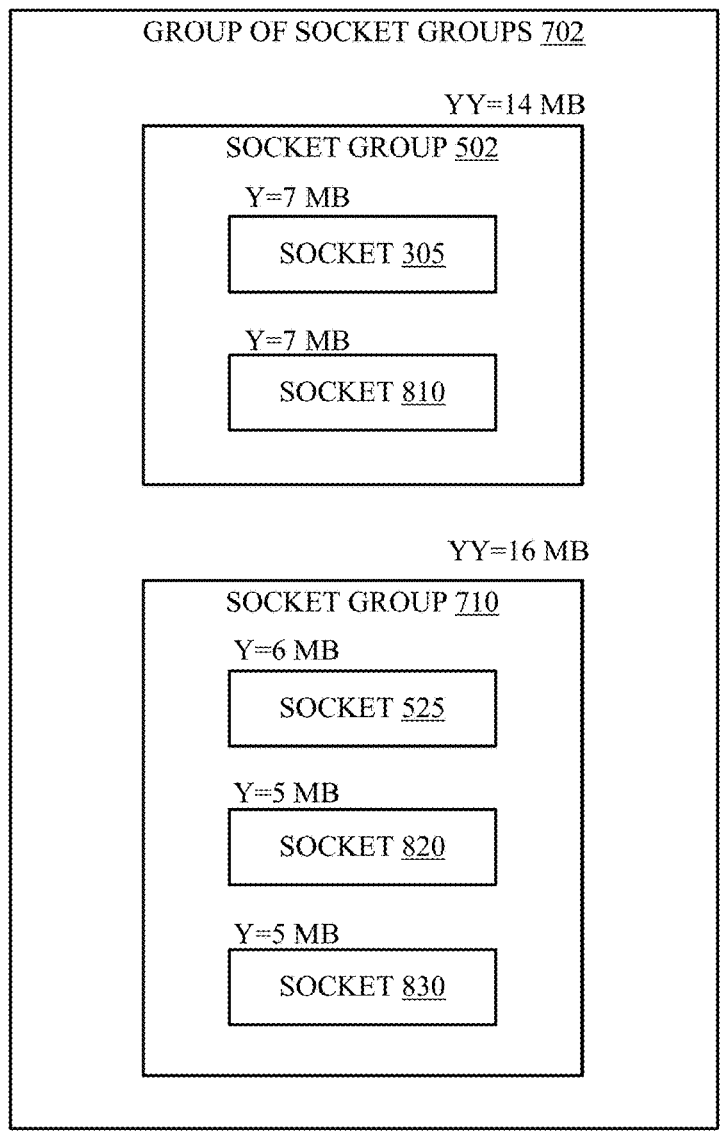
FIG. 8 illustrates apportioning resources among socket groups, in accordance with various embodiments.

Further, socket manager component 110 can set a defined groups aggregate data limit (YYY) on XXX. In this regard, and now referring to FIG. 8, in response to socket manager component 110 detecting a change of a difference between YYY and XXX, socket manager component 110 can reapportion resources among the respective socket groups of group of socket groups 702. In one embodiment, socket manager component 110 can apportion the resources among the respective socket groups by modifying YY values of the respective socket groups of group of socket groups 702. In turn, socket manager component 110 can reapportion resources, e.g., Y values, among sockets (e.g., 305, 810, 525, 820, 830) of a group of sockets to correspond with the YY value of the group of sockets.

Figure 9:
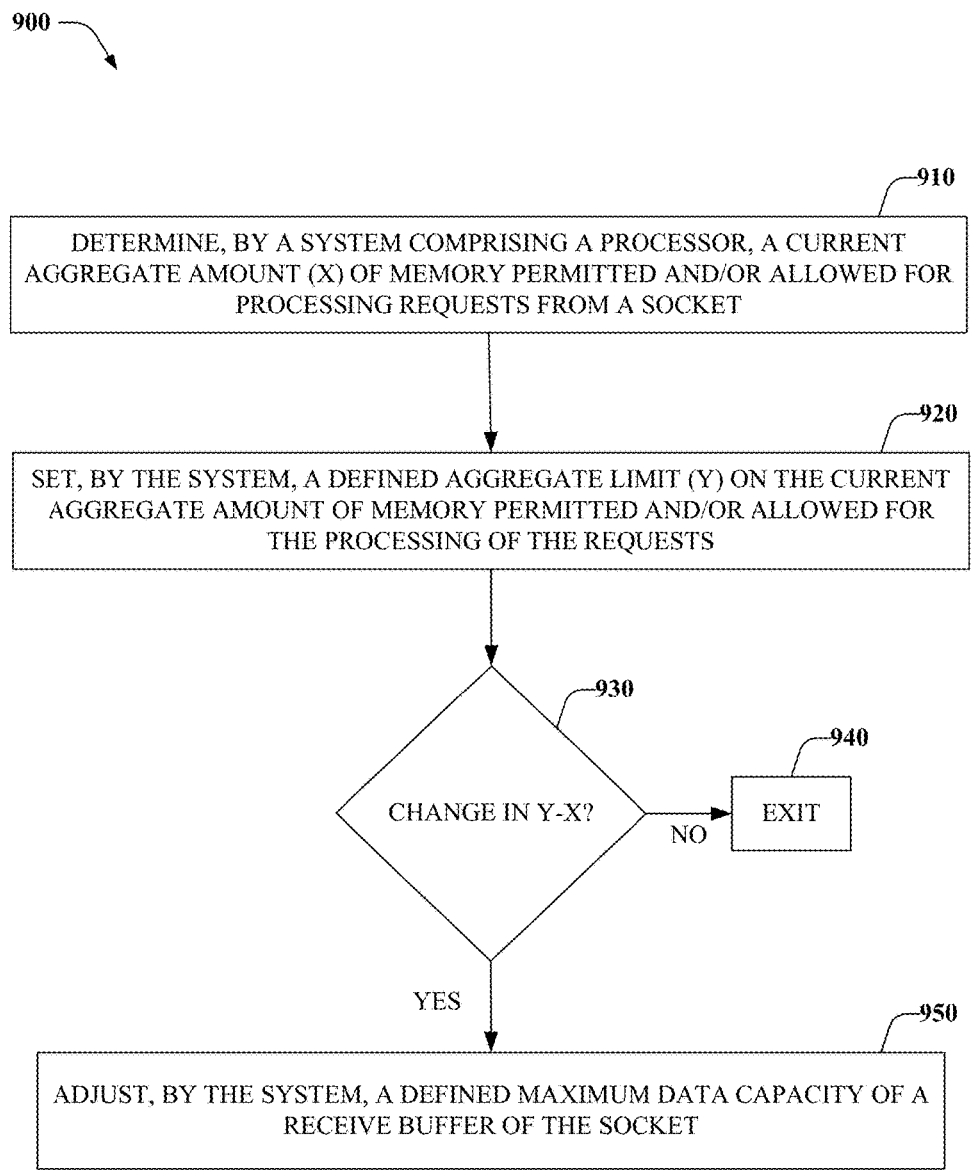
FIGS. 9-10 illustrate flowcharts of methods associated with aggregate socket resource management, in accordance with various embodiments.
Figure 10:
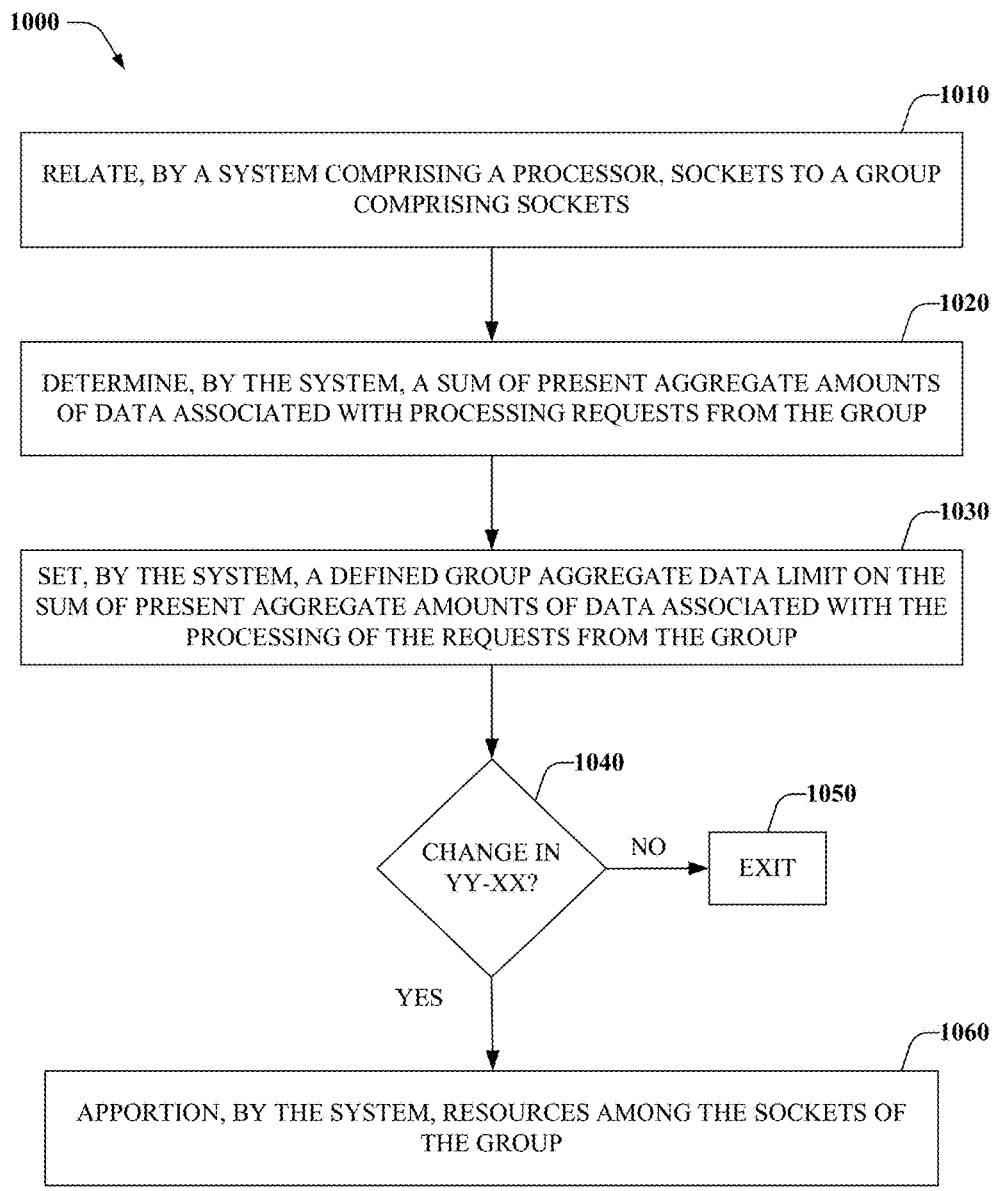

FIGS. 9-10 illustrate methodologies in accordance with the disclosed subject matter. For simplicity of explanation, the methodologies are depicted and described as a series of acts. It is to be understood and appreciated that various embodiments disclosed herein are not limited by the acts illustrated and/or by the order of acts. For example, acts can occur in various orders and/or concurrently, and with other acts not presented or described herein. Furthermore, not all illustrated acts may be required to implement the methodologies in accordance with the disclosed subject matter. In addition, those skilled in the art will understand and appreciate that the methodologies could alternatively be represented as a series of interrelated states via a state diagram or events. Additionally, it should be further appreciated that the methodologies disclosed hereinafter and throughout this specification are capable of being stored on an article of manufacture to facilitate transporting and transferring such methodologies to computers. The term article of manufacture, as used herein, is intended to encompass a computer program accessible from any computer-readable device, carrier, or media.

FIG. 9 illustrates process 900 performed by socket manager component 110, e.g., for performing aggregate socket resource management, in accordance with various embodiments. At 910, a current aggregate amount (X) of memory permitted and/or allowed for processing requests from a socket can be determined. At 920, a defined aggregate limit (Y) on the current aggregate amount of memory permitted and/or allowed for the processing of the requests can be set.

At 930, it can be determined whether a change in a difference between Y and X has occurred. If it has been determined that the change in the difference between Y and X has occurred, flow continues to 950, otherwise flow continues to 940 at which process 900 exits. At 950, a defined maximum data capacity of a receive buffer of the socket can be adjusted, e.g., based on a value of the change between Y and X.

FIG. 10 illustrates process 1000 performed by socket manager component 110, e.g., for dynamically apportioning resources among sockets of a group of sockets. At 1010, sockets can be related to a group of sockets, e.g., based on a defined criterion. At 1020, a sum (XX) of present aggregate amounts of data associated with processing requests from the group can be determined. At 1030, a defined group aggregate data limit (YY) on the sum of present aggregate amounts of data associated with the processing of the requests from the group can be set. At 1040, it can be determined whether a change in a difference between YY and XX has occurred. If it has been determined that the change in the difference between YY and XX has occurred, flow continues to 1060, otherwise flow continues to 1050 at which process 1000 exits. At 1060, resources can be apportioned among the sockets of the group in response to detecting the change of the difference.

Reference throughout this specification to "one embodiment," or "an embodiment," means that a particular feature, structure, or characteristic described in connection with the embodiment is included in at least one embodiment. Thus, the appearances of the phrase "in one embodiment," or "in an embodiment," in various places throughout this specification are not necessarily all referring to the same embodiment. Furthermore, the particular features, structures, or characteristics may be combined in any suitable manner in one or more embodiments.

Furthermore, to the extent that the terms "includes," "has," "contains," and other similar words are used in either the detailed description or the appended claims, such terms are intended to be inclusive—in a manner similar to the term "comprising" as an open transition word—without precluding any additional or other elements. Moreover, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

As utilized herein, the terms "logic," "logical," "logically," and the like are intended to refer to any information having the form of instruction signals and/or data that may be applied to direct the operation of a processor. Logic may be formed from signals stored in a device memory. Software is one example of such logic. Logic may also be comprised by digital and/or analog hardware circuits, for example, hardware circuits comprising logical AND, OR, XOR, NAND, NOR, and other logical operations. Logic may be formed from combinations of software and hardware. On a network, logic may be programmed on a server, or a complex of servers. A particular logic unit is not limited to a single logical location on the network.

As utilized herein, terms "component," "system," "interface," "manager," "layer," "information," "application," "server," "client" and the like are intended to refer to a computer-related entity, hardware, software (e.g., in execution), and/or firmware. For example, a component can be a processor, a process running on a processor, an object, an executable, a program, a storage device, and/or a computer. By way of illustration, an application running on a server, client, etc. and the server, client, etc. can be a component. One or more components can reside within a process, and a component can be localized on one computer and/or distributed between two or more computers.

Further, components can execute from various computer readable media having various data structures stored thereon. The components can communicate via local and/or remote processes such as in accordance with a signal having one or more data packets (e.g., data from one component interacting with another component in a local system, distributed system, and/or across a network, e.g., the Internet, with other systems via the signal).

As another example, a component can be an apparatus with specific functionality provided by mechanical parts operated by electric or electronic circuitry; the electric or electronic circuitry can be operated by a software application or a firmware application executed by one or more processors; the one or more processors can be internal or external to the apparatus and can execute at least a part of the software or firmware application. In yet another example, a component can be an apparatus that provides specific functionality through electronic components without mechanical parts; the electronic components can comprise one or more processors therein to execute software and/or firmware that confer(s), at least in part, the functionality of the electronic components.

Aspects of systems, apparatus, and processes explained herein can constitute machine-executable instructions embodied within a machine, e.g., embodied in a computer readable medium (or media) associated with the machine. Such instructions, when executed by the machine, can cause the machine to perform the operations described. Additionally, the systems, processes, process blocks, etc. can be embodied within hardware, such as an application specific integrated circuit (ASIC) or the like. Moreover, the order in which some or all of the process blocks appear in each process should not be deemed limiting. Rather, it should be understood by a person of ordinary skill in the art having the benefit of the instant disclosure that some of the process blocks can be executed in a variety of orders not illustrated.

Furthermore, the word "exemplary" and/or "demonstrative" is used herein to mean serving as an example, instance, or illustration. For the avoidance of doubt, the subject matter disclosed herein is not limited by such examples. In addition, any aspect or design described herein as "exemplary" and/or "demonstrative" is not necessarily to be construed as preferred or advantageous over other aspects or designs, nor is it meant to preclude equivalent exemplary structures and techniques known to those of ordinary skill in the art having the benefit of the instant disclosure.

The disclosed subject matter can be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, computer-readable carrier, or computer-readable media. For example, computer-readable media can comprise, but are not limited to, magnetic storage devices, e.g., hard disk; floppy disk; magnetic strip(s); optical disk (e.g., compact disk (CD), digital video disc (DVD), Blu-ray Disc (BD)); smart card(s); and flash memory device(s) (e.g., card, stick, key drive); and/or a virtual device that emulates a storage device and/or any of the above computer-readable media.

Artificial intelligence based systems, e.g., utilizing explicitly and/or implicitly trained classifiers, can be employed in connection with performing inference and/or probabilistic determinations and/or statistical-based determinations as in accordance with one or more aspects of the disclosed subject matter as described herein. For example, an artificial intelligence system can be used, via socket manager component 110, to dynamically apportion resources between sockets, socket groups, etc. as described herein.

A classifier can be a function that maps an input attribute vector, $x=(x1, x2, x3, x4, xn)$, to a confidence that the input belongs to a class, that is, $f(x)$=confidence (class). Such classification can employ a probabilistic and/or statistical-based analysis (e.g., factoring into the analysis utilities and costs) to infer an action that a user desires to be automatically performed. In the case of communication systems, for example, attributes can be information received from access points, servers, components of a wireless communication network, etc., and the classes can be categories or areas of interest (e.g., levels of priorities). A support vector machine is an example of a classifier that can be employed. The support vector machine operates by finding a hypersurface in the space of possible inputs, which the hypersurface attempts to split the triggering criteria from the non-triggering events. Intuitively, this makes the classification correct for testing data that is near, but not identical to training data. Other directed and undirected model classification approaches include, e.g., naïve Bayes, Bayesian networks, decision trees, neural networks, fuzzy logic models, and probabilistic classification models providing different patterns of independence can be employed. Classification as used herein can also be inclusive of statistical regression that is utilized to develop models of priority.

In accordance with various aspects of the subject specification, artificial intelligence based systems, components, etc. can employ classifiers that are explicitly trained, e.g., via a generic training data, etc. as well as implicitly trained, e.g., via observing characteristics of communication equipment, e.g., a server, etc., receiving reports from such communication equipment, receiving operator preferences, receiving historical information, receiving extrinsic information, etc. For example, support vector machines can be configured via a learning or training phase within a classifier constructor and feature selection module. Thus, the classifier(s) can be used by an artificial intelligence system to automatically learn and perform a number of functions, e.g., performed by socket manager component 110.

As used herein, the term "infer" or "inference" refers generally to the process of reasoning about, or inferring states of, the system, environment, user, and/or intent from a set of observations as captured via events and/or data. Captured data and events can include user data, device data, environment data, data from sensors, sensor data, application data, implicit data, explicit data, etc. Inference can be employed to identify a specific context or action, or can generate a probability distribution over states of interest based on a consideration of data and events, for example.

Inference can also refer to techniques employed for composing higher-level events from a set of events and/or data. Such inference results in the construction of new events or actions from a set of observed events and/or stored event data, whether the events are correlated in close temporal proximity, and whether the events and data come from one or several event and data sources. Various classification schemes and/or systems (e.g., support vector machines, neural networks, expert systems, Bayesian belief networks, fuzzy logic, and data fusion engines) can be employed in connection with performing automatic and/or inferred action in connection with the disclosed subject matter.

As it is employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions and/or processes described herein. Processors can exploit nano-scale architectures such as, but not limited to, molecular and quantum-dot based transistors, switches and gates, in order to optimize space usage or enhance performance of mobile devices. A processor may also be implemented as a combination of computing processing units.

In the subject specification, terms such as "store," "data store," "data storage," "database," "storage medium," "information," "socket", and substantially any other information storage component relevant to operation and functionality of a component and/or process, can refer to "memory components," or entities embodied in a "memory," or components comprising the memory. It will be appreciated that the memory components described herein can be either volatile memory or nonvolatile memory, or can comprise both volatile and nonvolatile memory.

By way of illustration, and not limitation, nonvolatile memory, for example, can be included in manager socket information 206, system socket information 230, non-volatile memory 1122 (see below), disk storage 1124 (see below), and/or memory storage 1146 (see below). Further, nonvolatile memory can be included in read only memory (ROM), programmable ROM (PROM), electrically programmable ROM (EPROM), electrically erasable ROM (EEPROM), or flash memory. Volatile memory 1120 can comprise random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

Figure 11:
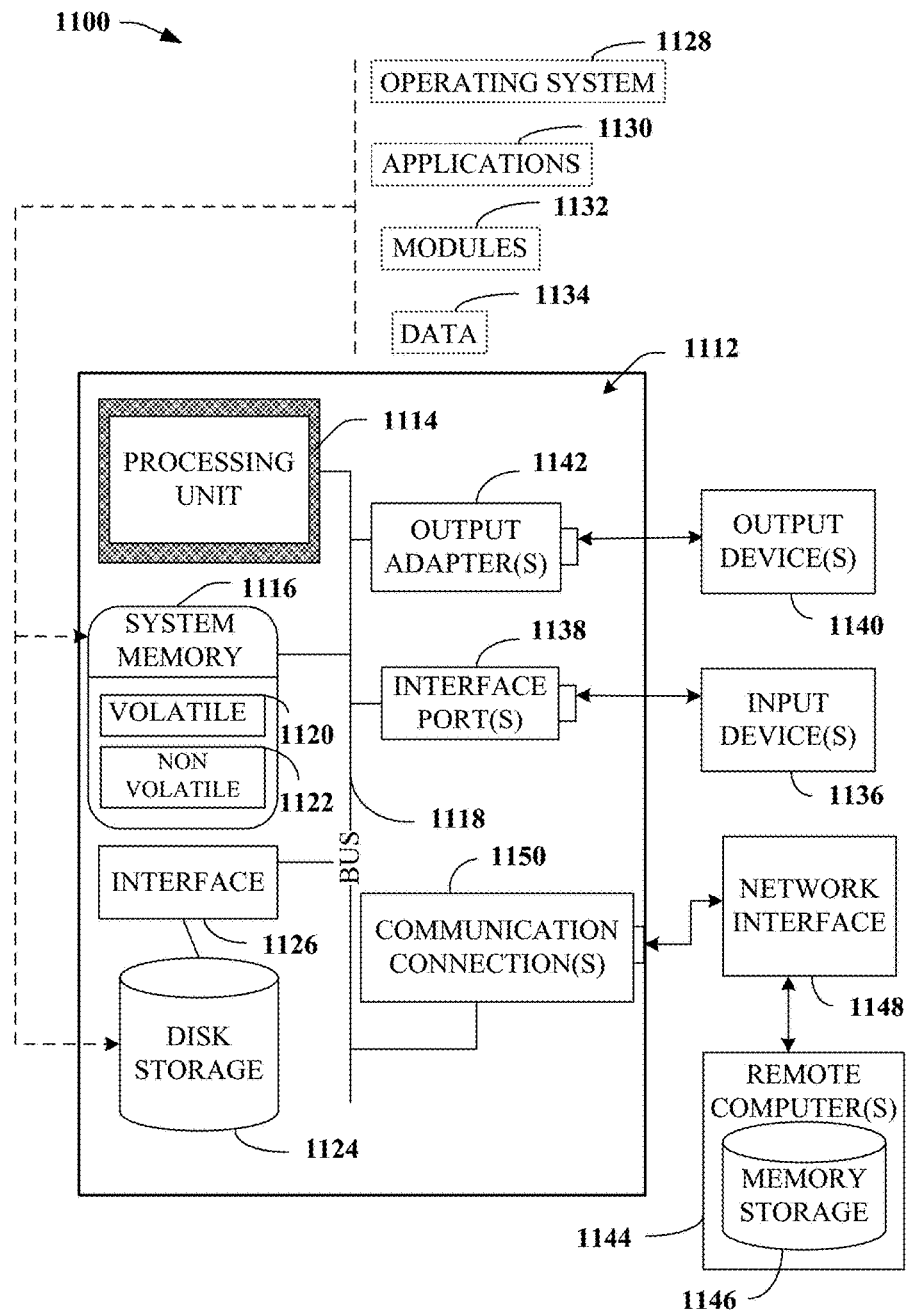
FIG. 11 illustrates a block diagram representing an illustrative non-limiting computing system or operating environment in which one or more aspects of various embodiments described herein can be implemented.

In order to provide a context for the various aspects of the disclosed subject matter, FIG. 11, and the following discussion, are intended to provide a brief, general description of a suitable environment in which the various aspects of the disclosed subject matter can be implemented. While the subject matter has been described above in the general context of computer-executable instructions of a computer program that runs on a computer and/or computers, those skilled in the art will recognize that various embodiments disclosed herein can be implemented in combination with other program modules. Generally, program modules comprise routines, programs, components, data structures, etc. that perform particular tasks and/or implement particular abstract data types.

Moreover, those skilled in the art will appreciate that the inventive systems can be practiced with other computer system configurations, comprising single-processor or multiprocessor computer systems, computing devices, mini-computing devices, mainframe computers, as well as personal computers, hand-held computing devices (e.g., PDA, phone, watch), microprocessor-based or programmable consumer or industrial electronics, and the like. The illustrated aspects can also be practiced in distributed computing environments where tasks are performed by remote processing devices that are linked through a communication network; however, some if not all aspects of the subject disclosure can be practiced on stand-alone computers. In a distributed computing environment, program modules can be located in both local and remote memory storage devices.

With reference to FIG. 11, a block diagram of a computing system 1100, e.g., server 302, operable to execute the disclosed systems and methods is illustrated, in accordance with an embodiment. Computer 1112 comprises a processing unit 1114, a system memory 1116, and a system bus 1118. System bus 1118 couples system components comprising, but not limited to, system memory 1116 to processing unit 1114. Processing unit 1114 can be any of various available processors. Dual microprocessors and other multiprocessor architectures also can be employed as processing unit 1114.

System bus 1118 can be any of several types of bus structure(s) comprising a memory bus or a memory controller, a peripheral bus or an external bus, and/or a local bus using any variety of available bus architectures comprising, but not limited to, industrial standard architecture (ISA), micro-channel architecture (MSA), extended ISA (EISA), intelligent drive electronics (IDE), VESA local bus (VLB), peripheral component interconnect (PCI), card bus, universal serial bus (USB), advanced graphics port (AGP), personal computer memory card international association bus (PCMCIA), Firewire (IEEE 1394), small computer systems interface (SCSI), and/or controller area network (CAN) bus used in vehicles.

System memory 1116 comprises volatile memory 1120 and nonvolatile memory 1122. A basic input/output system (BIOS), containing routines to transfer information between elements within computer 1112, such as during start-up, can be stored in nonvolatile memory 1122. By way of illustration, and not limitation, nonvolatile memory 1122 can comprise ROM, PROM, EPROM, EEPROM, or flash memory. Volatile memory 1120 comprises RAM, which acts as external cache memory. By way of illustration and not limitation, RAM is available in many forms such as SRAM, dynamic RAM (DRAM), synchronous DRAM (SDRAM), double data rate SDRAM (DDR SDRAM), enhanced SDRAM (ESDRAM), Synchlink DRAM (SLDRAM), Rambus direct RAM (RDRAM), direct Rambus dynamic RAM (DRDRAM), and Rambus dynamic RAM (RDRAM).

Computer 1112 also comprises removable/non-removable, volatile/non-volatile computer storage media. FIG. 11 illustrates, for example, disk storage 1124. Disk storage 1124 comprises, but is not limited to, devices like a magnetic disk drive, floppy disk drive, tape drive, Jaz drive, Zip drive, LS-100 drive, flash memory card, or memory stick. In addition, disk storage 1124 can comprise storage media separately or in combination with other storage media comprising, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 1124 to system bus 1118, a removable or non-removable interface is typically used, such as interface 1126.

It is to be appreciated that FIG. 11 describes software that acts as an intermediary between users and computer resources described in suitable operating environment 1100. Such software comprises an operating system 1128. Operating system 1128, which can be stored on disk storage 1124, acts to control and allocate resources of computer system 1112. System applications 1130 take advantage of the management of resources by operating system 1128 through program modules 1132 and program data 1134 stored either in system memory 1116 or on disk storage 1124. It is to be appreciated that the disclosed subject matter can be implemented with various operating systems or combinations of operating systems.

A user can enter commands or information into computer 1112 through input device(s) 1136. Input devices 1136 comprise, but are not limited to, a pointing device such as a mouse, trackball, stylus, touch pad, keyboard, microphone, joystick, game pad, satellite dish, scanner, TV tuner card, digital camera, digital video camera, web camera, cellular phone, user equipment, smartphone, and the like. These and other input devices connect to processing unit 1114 through system bus 1118 via interface port(s) 1138. Interface port(s) 1138 comprise, for example, a serial port, a parallel port, a game port, a universal serial bus (USB), a wireless based port, e.g., Wi-Fi, Bluetooth, etc. Output device(s) 1140 use some of the same type of ports as input device(s) 1136.

Thus, for example, a USB port can be used to provide input to computer 1112 and to output information from computer 1112 to an output device 1140. Output adapter 1142 is provided to illustrate that there are some output devices 1140, like display devices, light projection devices, monitors, speakers, and printers, among other output devices 1140, which use special adapters. Output adapters 1142 comprise, by way of illustration and not limitation, video and sound devices, cards, etc. that provide means of connection between output device 1140 and system bus 1118. It should be noted that other devices and/or systems of devices provide both input and output capabilities such as remote computer(s) 1144.

Computer 1112 can operate in a networked environment using logical connections to one or more remote computers, such as remote computer(s) 1144. Remote computer(s) 1144 can be a personal computer, a server, a router, a network PC, a workstation, a microprocessor based appliance, a peer device, or other common network node and the like, and typically comprises many or all of the elements described relative to computer 1112.

For purposes of brevity, only a memory storage device 1146 is illustrated with remote computer(s) 1144. Remote computer(s) 1144 is logically connected to computer 1112 through a network interface 1148 and then physically and/or wirelessly connected via communication connection 1150. Network interface 1148 encompasses wire and/or wireless communication networks such as local-area networks (LAN) and wide-area networks (WAN). LAN technologies comprise fiber distributed data interface (FDDI), copper distributed data interface (CDDI), Ethernet, token ring and the like. WAN technologies comprise, but are not limited to, point-to-point links, circuit switching networks like integrated services digital networks (ISDN) and variations thereon, packet switching networks, and digital subscriber lines (DSL).

Communication connection(s) 1150 refer(s) to hardware/software employed to connect network interface 1148 to bus 1118. While communication connection 1150 is shown for illustrative clarity inside computer 1112, it can also be external to computer 1112. The hardware/software for connection to network interface 1148 can comprise, for example, internal and external technologies such as modems, comprising regular telephone grade modems, cable modems and DSL modems, wireless modems, ISDN adapters, and Ethernet cards.

The computer 1112 can operate in a networked environment using logical connections via wired and/or wireless communications to one or more remote computers, cellular based devices, user equipment, smartphones, or other computing devices, such as workstations, server computers, routers, personal computers, portable computers, microprocessor-based entertainment appliances, peer devices or other common network nodes, etc. The computer 1112 can connect to other devices/networks by way of antenna, port, network interface adaptor, wireless access point, modem, and/or the like.

The computer 1112 is operable to communicate with any wireless devices or entities operatively disposed in wireless communication, e.g., a printer, scanner, desktop and/or portable computer, portable data assistant, communications satellite, user equipment, cellular base device, smartphone, any piece of equipment or location associated with a wirelessly detectable tag (e.g., scanner, a kiosk, news stand, restroom), and telephone. This comprises at least Wi-Fi and Bluetooth wireless technologies. Thus, the communication can be a predefined structure as with a conventional network or simply an ad hoc communication between at least two devices.

Wi-Fi allows connection to the Internet from a desired location (e.g., a vehicle, couch at home, a bed in a hotel room, or a conference room at work, etc.) without wires. Wi-Fi is a wireless technology similar to that used in a cell phone that enables such devices, e.g., mobile phones, computers, etc., to send and receive data indoors and out, anywhere within the range of a base station. Wi-Fi networks use radio technologies called IEEE 802.11 (a, b, g, etc.) to provide secure, reliable, fast wireless connectivity. A Wi-Fi network can be used to connect communication devices (e.g., mobile phones, computers, etc.) to each other, to the Internet, and to wired networks (which use IEEE 802.3 or Ethernet). Wi-Fi networks operate in the unlicensed 2.4 and 5 GHz radio bands, at an 11 Mbps (802.11a) or 54 Mbps (802.11b) data rate, for example, or with products that contain both bands (dual band), so the networks can provide real-world performance similar to the basic 10BaseT wired Ethernet networks used in many offices.

The above description of illustrated embodiments of the subject disclosure, comprising what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize.

In this regard, while the disclosed subject matter has been described in connection with various embodiments and corresponding Figures, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

What is claimed is:

1. A system, comprising:
a processor; and
a memory that stores executable instructions that, when executed by the processor, facilitate performance of operations, comprising:
    determining a present aggregate amount of data associated with processing requests from a socket comprising
        determining a first amount of read request data that has been read from a receive buffer of the socket,
        determining a second amount of reply data that has been written to a send buffer of the socket and is pending transmission, and
        in response to interpreting a request of the requests, predicting a predicted amount of reply data to be generated based on the read request data that has been read from the receive buffer, wherein the present aggregate amount of data associated with the processing the requests from the socket comprises a sum of the first amount of read request data that has been read from the receive buffer, the second amount of reply data that has been written to the send buffer, and the predicted amount of reply data to be generated;
    setting a defined aggregate data limit on the present aggregate amount of data associated with the processing the requests from the socket; and
    in response to determining changes in a difference between the defined aggregate data limit and the present aggregate amount of data associated with the processing the requests from the socket, modifying a defined data capacity limit on a data capacity of the receive buffer of the socket.

2. The system of claim 1, wherein the determining the present aggregate amount of data comprises:
determining a third amount of received request data in the receive buffer that is pending being read from the receive buffer.

3. The system of claim 1, wherein the determining the first amount comprises:
determining an amount of read request data that is at least one of being processed or pending being processed.

4. The system of claim 1, wherein the determining the changes comprises:
in response to the difference between the defined aggregate data limit and the present aggregate amount of data being determined to be decreasing, reducing the defined data capacity limit on the data capacity of the receive buffer.

5. The system of claim 1, wherein the determining the changes comprises:
in response to the difference between the defined aggregate data limit and the present aggregate amount of data being determined to be increasing, increasing the defined data capacity limit on the data capacity of the receive buffer.

6. The system of claim 1, wherein the determining the changes comprises:
in response to the present aggregate amount of data being determined to be greater than or equal to the defined aggregate data limit, setting the defined data capacity limit on the data capacity of the receive buffer to zero.

7. The system of claim 1, wherein operations further comprise:
based on a first defined criterion, relating the socket to a first group comprising sockets;
determining a first sum of present aggregate amounts of data associated with processing requests from the first group;
setting a defined group aggregate data limit on the first sum of present aggregate amounts of data associated with the processing the requests from the first group; and
in response to detecting a first change of a first difference between the defined group aggregate data limit and the first sum of present aggregate amounts of data associated with the processing the requests from the first group, apportioning resources among the sockets.

8. The system of claim 7, wherein the apportioning the resources among the sockets comprises:
modifying the defined aggregate data limit on the present aggregate amount of data associated with the processing the requests from the socket.

9. The system of claim 7, wherein the difference between the defined group aggregate data limit and the first sum of present aggregate amounts of data is a first difference, and wherein the operations further comprise:
based on a second defined criterion, relating the first group to a second group comprising groups of sockets;
determining a second sum of present aggregate amounts of data associated with processing requests from the second group;
setting a defined groups aggregate data limit on the second sum of present aggregate amounts of data associated with the processing the requests from the second group; and
in response to detecting a second change of a second difference between the defined groups aggregate data limit and the second sum of present aggregate amounts of data associated with the processing the requests from the second group, apportioning the resources among the groups of sockets.

10. The system of claim 9, wherein the apportioning the resources among the groups of sockets comprises:
modifying the defined group aggregate data limit on the first sum of present aggregate amounts of data associated with the processing the requests from the first group.

11. A method, comprising:
determining, by a system comprising a processor, a current aggregate amount of memory reserved for processing requests from a socket, the determining comprising
    determining a first amount of response data that has been written to a send buffer of the socket and is pending being sent to a client device,
    determining a second amount of read request data that has been read from a receive buffer of the socket, and
    in response to the processing the requests, determining a third amount of reply data to be generated based on the second amount of read request data, wherein the current aggregate amount of memory reserved for the processing the requests is based on a sum of the first amount of response data that has been written to the send buffer, the second amount of read request data that has been read from the receive buffer, and the third amount of reply data to be generated;
allocating, by the system, a defined aggregate limit on the current aggregate amount of memory reserved for the processing the requests; and in response to determining changes in a difference between the defined aggregate limit and the current aggregate amount of memory reserved for the processing the requests, adjusting, by the system, a defined maximum data capacity of the receive buffer of the socket.

12. The method of claim 11, wherein the determining the current aggregate amount of memory reserved for the processing comprises:
   determining a third amount of received request data in the receive buffer that is pending being read from the receive buffer.

13. The method of claim 11, wherein the determining the second amount of read request data comprises:
   determining an amount of read request data that is at least one of being processed or pending being processed.

14. The method of claim 11, wherein the determining the changes comprises:
   in response to the difference between the defined aggregate limit and the current aggregate amount of memory being determined to be decreasing, reducing the defined maximum data capacity of the receive buffer.

15. The method of claim 11, wherein the determining the changes comprises:
   in response to the difference between the defined aggregate limit and the current aggregate amount of memory being determined to be increasing, increasing the defined maximum data capacity of the receive buffer.

16. The method of claim 11, wherein the determining the changes comprises:
   in response to the current aggregate amount of memory being determined to be greater than or equal to the defined aggregate limit, setting the defined maximum data capacity of the receive buffer to zero.

17. A non-transitory computer-readable storage medium comprising instructions that, in response to execution, cause a device comprising a processor to perform operations, comprising:
   in response to receiving requests in a receive buffer of a socket, determining an aggregate amount of memory to be consumed, by the device, for processing the requests, wherein the determining the aggregate amount of memory to be consumed comprises
     determining a first amount of reply data that has been written to a send buffer of the socket and is pending transmission,
     determining a second amount of read request data that has been read from the receive buffer, and
     predicting a third amount of reply data to be generated as a result of processing at least a portion of the requests utilizing the read request data, wherein the aggregate amount of memory to be consumed corresponds to a sum of the first amount, the second amount, and the third amount;
   providing an aggregate limit on the aggregate amount of memory to be consumed; and
   based on an ongoing evaluation of a difference between the aggregate limit and the aggregate amount of memory to be consumed, dynamically modifying a defined maximum storage capacity of the receive buffer.

18. The non-transitory computer-readable storage medium of claim 17, wherein the dynamically modifying the defined maximum storage capacity comprises:
   in response to determining that the difference between the aggregate limit and the aggregate amount of memory being consumed has been increasing, increasing the defined maximum storage capacity of the receive buffer.

19. The non-transitory computer-readable storage medium of claim 17, wherein the dynamically modifying the defined maximum storage capacity comprises:
   in response to determining that the difference between the aggregate limit and the aggregate amount of memory being consumed has been decreasing, decreasing the defined maximum storage capacity of the receive buffer.

20. The non-transitory computer-readable storage medium of claim 17, wherein the determining the second amount comprises:
   determining an amount of read request data that is at least one of being processed or pending being processed.

* * * * *